Oct. 21, 1947.     H. W. HAPMAN     2,429,549
FLIGHT CONVEYER
Filed May 5, 1943     4 Sheets-Sheet 1
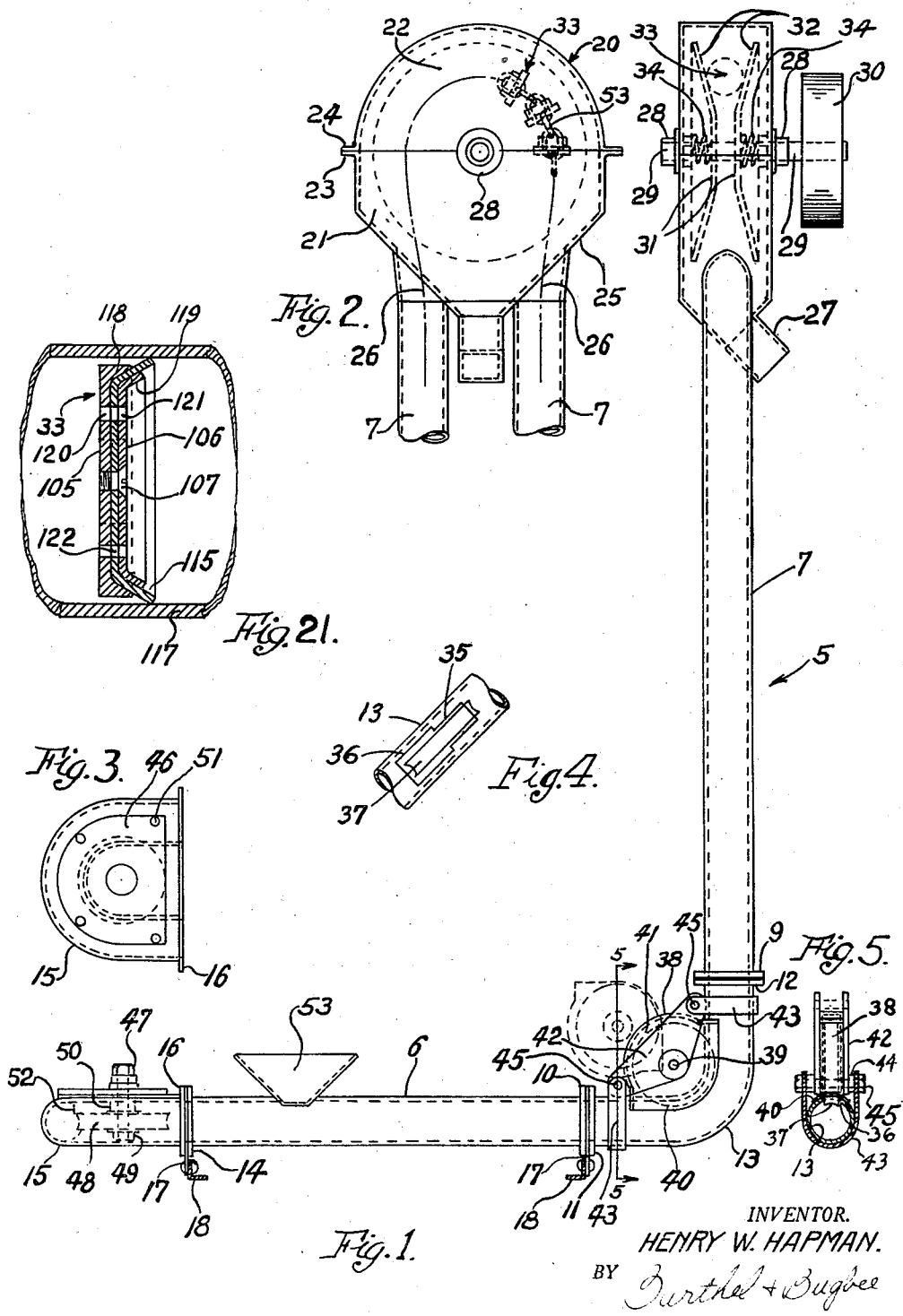
INVENTOR.
HENRY W. HAPMAN.
BY Burthel + Bugbee Oct. 21, 1947.　　　H. W. HAPMAN　　　2,429,549
FLIGHT CONVEYER
Filed May 5, 1943　　　4 Sheets-Sheet 2

INVENTOR.
HENRY W. HAPMAN.
BY Barthel & Bugbee

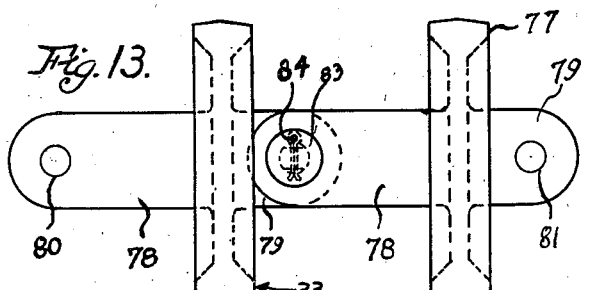
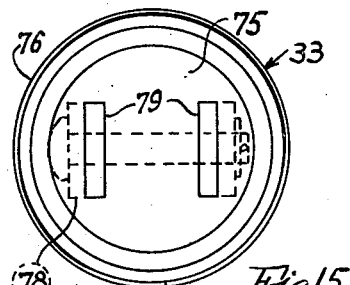
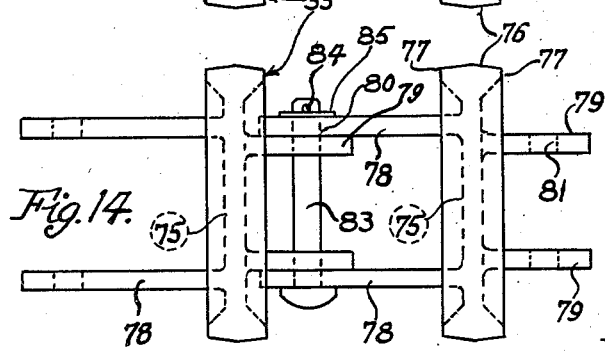
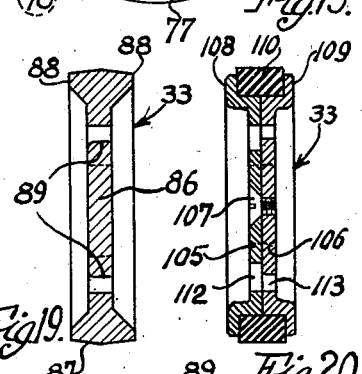
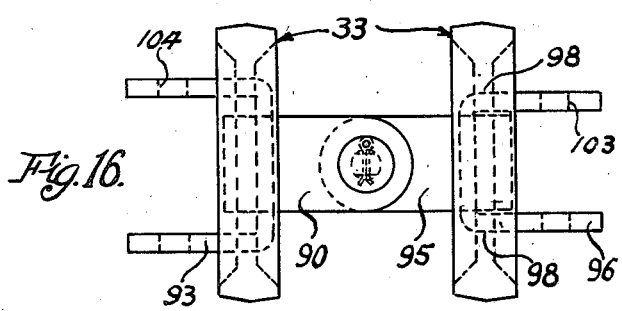
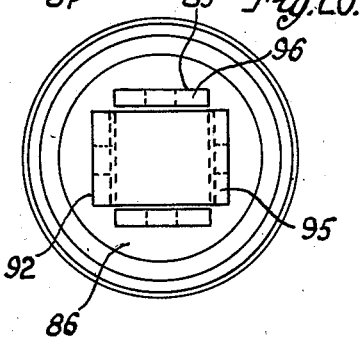
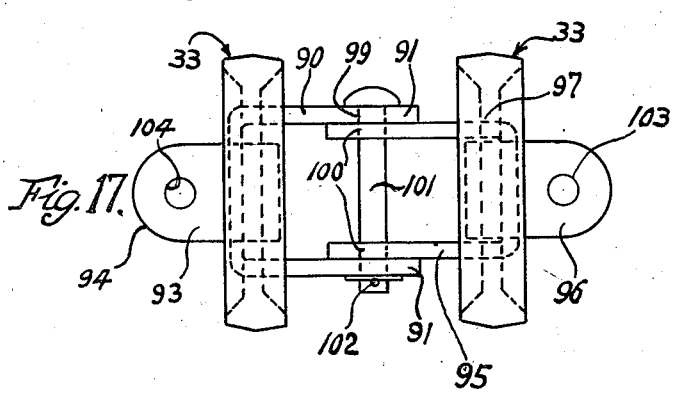

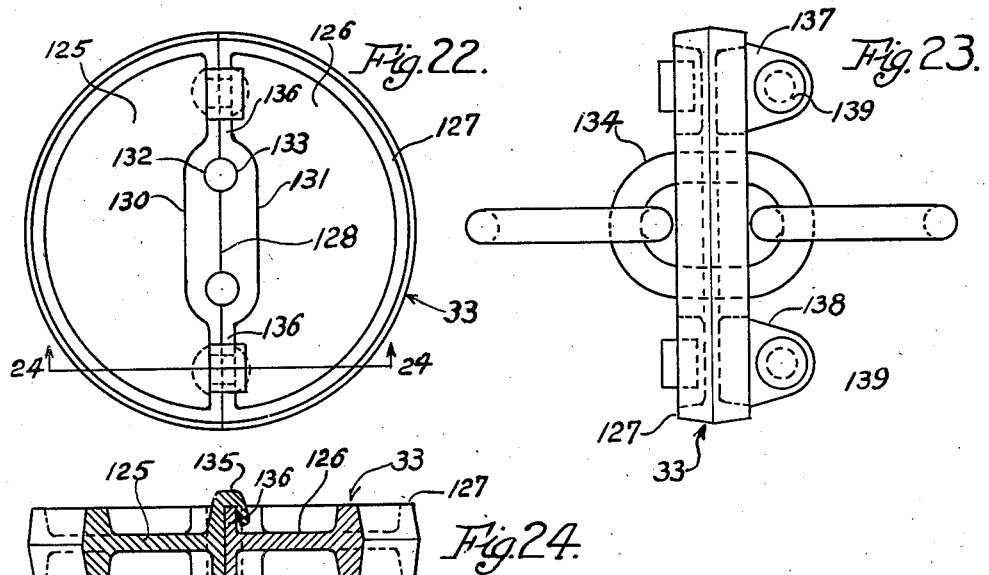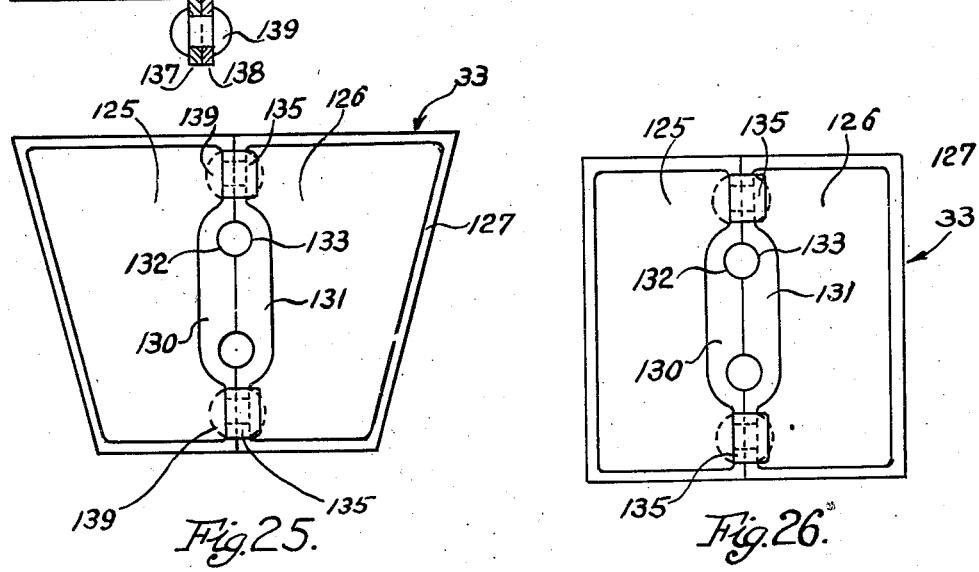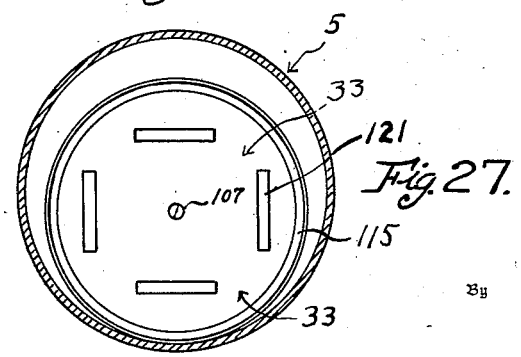

Patented Oct. 21, 1947

2,429,549

UNITED STATES PATENT OFFICE 2,429,549

FLIGHT CONVEYER

Henry W. Hapman, Detroit, Mich.

Application May 5, 1943, Serial No. 485,707

7 Claims. (Cl. 198—172)

The present invention relates to improvements in conveyors and more particularly, to a conveyor flight therefor.

The primary object of the invention is to provide a conveyor structure in which the conveying elements may travel in multi-plane directions without requiring costly sprocket structures to guide said conveying element in three or more angular directions.

Another object of the invention is to provide a conveyor structure in which the conveying element is guided within the conveyor housing at the locations of angular movement by flight engaging rollers supported adjacent the turns in said housing, which guide rollers may be easily removed or replaced and inspected from time to time thereby eliminating waste in labor and the cessation of operation during such repair work, replacement of parts and inspection.

Another object of the invention is to provide a conveyor structure having a series of separably connected conveyor flights to facilitate the easy assembling of the conveyor element, and replacement of parts and allow said conveyor flights to move in angular directions without distorting or twisting the same out of shape during their travel in the conveyor housing.

Another object of the invention is to provide a conveyor structure having separably connected flights which are united by connecting pins or bolts arranged alternately at right angles to one another throughout the length of the conveyor element.

Another object of the invention is to provide a conveyor having a conveyor element formed of a series of sectional conveyor flights capable of being bolted together and positioned upon the links of a conveyor chain in such a manner that the flights will be clamped thereto and held against longitudinal movement thereon, whereby said flights may be individually attached to or removed from said conveyor chain, as desired, in predetermined locations along said chain.

Another object of the invention is to provide a conveyor flight which is comparatively simple in construction and novel in arrangement and which comprises comparatively few parts to become disorganized, thereby enhancing the adaptability of said flights to various forms of conveyor structures.

Another object of the invention is to provide a conveyor, as set forth in the preceding objects, in which the conveyor flights are propelled during their circuitous travel by transmission means engaging the peripheral or opposed portions of said flights so as to eliminate the employment of traversing and propelling sprockets and further reduce the cost of the conveyor assembly.

Another object is to provide a conveyor structure as set forth in the preceding objects wherein the conveyor flights are arranged in spaced relation so that in the event one of the flight members is broken, the remaining flights will be sufficiently close to allow contactual driving engagement between the flights and driving members so that the remaining flights will follow a line of a circle in traversing the driving members and guide pulleys.

Another object of the invention is to provide a conveyor structure of the above-mentioned type in which the conveyor flights are provided with a marginal enlarged portion forming a flight having cup-shaped depressions for more easily and readily engaging the material being conveyed and insure the self-cleaning of the flights as they traverse the unloading station.

Other object and advantages of the invention will become apparent during the course of the following description of the accompanying drawings wherein:

Figure 1 is a side elevational view of the invention illustrating the same applied to an L-type conveyor illustrating the manner in which the conveyor flights are driven by expansible pulley discs engaging opposed edges of said flights;

Figure 2 is a fragmentary front elevational view illustrating the upper portion of the conveyor housing at the discharge end thereof;

Figure 3 is a top plan view of one of the removable guide pulleys adjacent the feed end of the conveyor;

Figure 4 is a fragmentary plan view of the conveyor housing illustrating another guide pulley and showing the manner in which the slot cut in the conveyor housing is formed to prevent the escape of material therefrom;

Figure 5 is a vertical cross sectional view taken on line 5—5 of Figure 1 looking in the direction of the arrows, illustrating the manner in which the guide pulley may be released to facilitate inspection thereof;

Figure 13 is a side elevational view of a further modified form of the invention illustrating a pair of flight members connected to swing in a single plane;

Figure 14 is a top plan view of the form of flight shown in Figure 13 illustrating in detail the manner in which the flights are coupled;

Figure 15 is an end elevational view of the form of flight shown in Figures 13 and 14 showing the manner in which the connecting links are overlapped and variously spaced to facilitate the reception of a coupling pin;

Figure 16 is a side elevational view of a further modified form of the invention showing separately connected flights connected together to swing about right angular planes;

Figure 17 is a plan view of the flight structure shown in Figure 16 illustrating in detail the manner in which the flights are separably connected by strap links;

Figure 18 is an end elevational view of the flight structures shown in Figures 16 and 17 showing the manner in which the strap links are arranged for a multi-plane swing;

Figure 19 is a cross sectional view of one of the flights illustrated in Figures 16 to 18 inclusive illustrating the manner in which the openings are formed in diametrical alignment for the reception of the coupling straps;

Figure 20 is a vertical diametrical cross sectional view of a still further modified form of the invention constructed similarly to the flight element shown in Figure 19 but being provided with a peripheral sealing strip, wearing ring or packing element;

Figure 21 is a sectional view of a still further modified form of the invention and while being similar to the form shown in Figure 20 it is provided with a packing element or wearing ring of a different form;

Figure 22 is an end elevational view of another modified form of the invention similar to the form shown in Figs. 6 to 9 inclusive illustrating a slightly different arrangement for connecting the semi-circular flight sections together;

Figure 23 is a side elevational view of the flight construction illustrated in Figure 22 showing in detail the arrangement for connecting the sections and securing the same to a chain having relatively short links;

Figure 24 is a cross sectional view taken on a segmental line 24—24 of Figure 22 looking in the direction of the arrows further illustrating in detail the manner in which the semi-circular sections are connected to accommodate conveyor chains having relatively short links;

Figure 25 is an end elevational view of a conveyor flight similar to the form shown in Figures 22 to 24 inclusive but of a slightly different shape;

Figure 10:
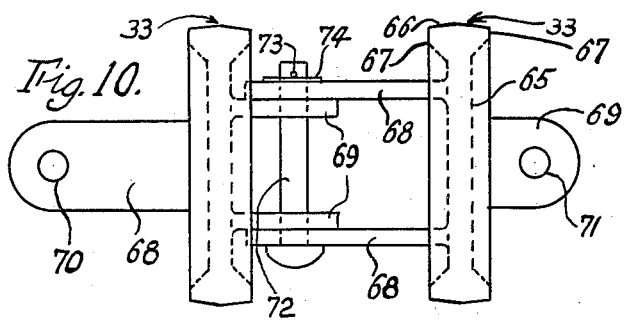
Figure 10 is a side elevational view of a modified form of flight construction in which the flights are interconnected to swing in planes at right angles to one another.

Figure 26 is likewise similar in construction to the form shown in Figures 22 to 24 inclusive although of a different shape; and Figure 27 is a cross sectional view representing a tubular conveyor casing of a slightly larger diameter than the diameter of the flight element illustrating in detail the manner in which a conveyor flight will be arranged during horizontal travel through the tubular casing.

Attention is first directed to Figures 1 to 9 inclusive wherein there is shown a preferred embodiment of the invention and wherein like reference characters will be employed to designate like parts throughout the same. The reference character 5 in Fig. 1 will generally be employed to designate an L-type conveyor having a pair of horizontal conveyor housing sections 6 connected to a pair of vertical conveyor housing sections 7. The conveyor housings 6 and 7 are of tubular construction and are provided at adjacent ends with coupling flanges 9 and 10 respectively for connection with similar coupling flanges 11 and 12 on an elbow joint 13. Adjacent the free ends of the horizontal section 6 are similar coupling flanges 14 for connection with a U-shaped casing 15 by attachment to complementary coupling flanges 16. Interposed between the coupling flanges 10 and 11, and 16 and 14 is a pair of supporting plates 17 to the lower ends of which are attached brackets 18 to facilitate the bolting of the conveyor to a floor surface or other similar support.

The upper ends of the vertical tubular conveyor housing sections 7 are secured to a housing generally designated by the reference character 20 and said housing comprises divided bottom and top sections 21 and 22 fastened together by flanges 23 and 24 respectively. The lower section 21 is provided with converging walls 25 to which the upper ends of the vertical tubular conveyor housing sections 7 are attached as at 26 (Figure 2) and intermediate the connections 26 is a discharge chute 27 at the apex of the converging bottom walls 25. The upper section 22 is constructed to provide a semi-circular housing or casing section and interposed between the casing sections 21 and 22 at their point of division is a pair of shaft bearings 28 for rotatably supporting a drive shaft 29. One end of the drive shaft is provided with a drive pulley 30 keyed thereto, while the end of the shaft within the casing 20 is provided with a pair of spaced pulley conveyors 31 having outwardly flared peripheral portions 32 for engaging the peripheral portion of the conveyor flights generally designated by the reference character 33. The pulley halves 31 are keyed on the shaft 29 for axial sliding movement and coil springs 34 are interposed between the bearings 28 and the pulley halves 31 to urge the same inwardly toward one another so that the outwardly flared portions 32 will frictionally engage the peripheral portions of the conveyor flights 33.

Each of the conveyor section connecting elbows 13 is provided at its inner bend with a slot 35 of a relatively narrow width at one end while the opposite end is enlarged as at 36, as is clearly shown in Figure 4. A guide pulley 37 projects into each slot 35 and is rotatably supported in a pulley housing or casing 38 by means of a spindle 39. The housing 38 is provided with a curved flange 40 adapted to overlie the elbow 13 on opposite sides of the slot 35, thereby preventing loss of material. Each of the pulley housings 38 is substantially semi-circular in shape and is provided along its side walls 41 with a bracket arm 42 secured in place by clamping straps 43 as by means of bolts or the like 45. By removing one of the fastening bolts 45 the brackets 42 may be swung on the other bolt to facilitate inspection of the guide pulley 37 as well as the conveyor flights 33. The differential slot 35 allows material escaping between the reduced portion of the opening to drop below and find its way to the conveyor housing through enlarged opening 36 whereby collection of its material will be prevented from clogging the pulley 37. Spacing washers 44 are interposed between the supporting plates 42 and clamping straps 43 on opposite sides of the pulley housing 38.

The guide pulley housing 15 is of a general U-shaped construction and is provided with a detachable cover plate 46 to which is attached a pulley supporting bolt 47 for rotatably supporting a pulley 48. A nut 49 is threaded on the lower end of the bolt 47 to secure the pulley in place and suitable washers may be interposed between the cover plate 46 and pulley, as at 50, to allow free rotation of the pulley with respect to the bolt. The cover plate 46 is fastened in place by circumferentially spaced bolts 51 anchored to the pulley guide housing 15, and said guide housing 15 is adapted to be cut away as at 52 on a circumference slightly larger than the peripheral size of the pulley 48, whereby detachment of the bolts 51 will allow the removal of the plate 46 and accommodate the removal of the pulley 48. The pulley 48 is adapted to engage the peripheral edges of the flights 33 in substantially the same manner as the guide pulley 37 in the housing 41. One of the horizontal conveyor housing sections 6 may be provided with a hopper 53 at a convenient location, into which material is fed for being elevated or conveyed to the discharge spout 27.

In Figures 1 to 9 inclusive, the conveyor flights 33 are shown as being connected to an endless chain comprising interconnected links 53 having the flights 33 secured thereto and the chain 53 trained over the pulleys 32 and guided by the guide pulleys 37 and 48. The chain is of usual construction and the links 53 are of the conventional oval type with alternate links arranged in substantially the same plane.

Each of the conveyor flights 33 comprises a pair of semi-circular sections 54 and 55 divided along a diametrical line, as at 56, so that when coupled together they will form a disc-shaped conveyor flight having a peripheral enlarged portion 57 continuous around the marginal edge of said flight. The half sections 54 and 55 are provided with diametrically opposed lugs 58 and 59 having complemental surfaces adapted to be clamped together by means of rivets or the like as at 60. It is to be noted that the lugs 58 and 59 are formed on one side of the flight sections 54 and 55 and extend axially on opposite sides of the chain links 53. The opposite side of each conveyor flight 33 is provided with a pair of complementary clamping lugs 61 and 62 having complementary cut-away portions to form parallel openings 63 on opposite sides of the axis of said flight. In assembly, the flight sections 54 and 55 are clamped about one of the chain links 53 and the bolts or rivets 60 are fastened in place to secure the lugs 58 and 59 together as shown clearly in Figures 8 and 9. After the bolts or rivets 60 have thus been secured in place, a bolt or the like 64 is passed through aligned openings in the clamping lugs 61 and 62 so as to pass through the link 53 clamped therebetween. It is to be noted that the peripheral portion 57 is enlarged to provide oppositely disposed peripheral flanged edges which engage the side walls of the conveyor housing conduits 6 and 7 and scrape the material adhering thereto from said walls.

Figure 12:
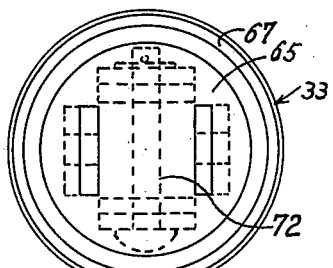
Figure 12 is an end elevational view of one of the flights shown in Figures 10 and 11 illustrating the manner in which the connecting links are formed integral therewith and positioned in spaced pairs at right angles to one another.
Figure 11:
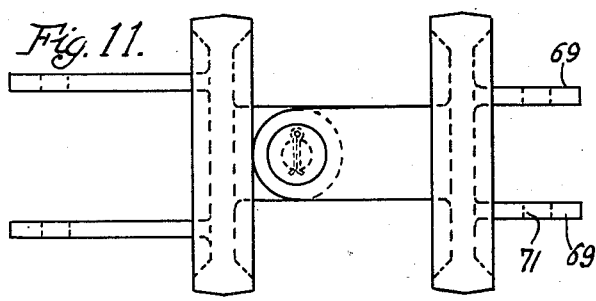
Figure 11 is a top plan view taken at right angles to Figure 10 further illustrating the manner in which the flights are interconnected by multiplane hinged members.
Figure 9:
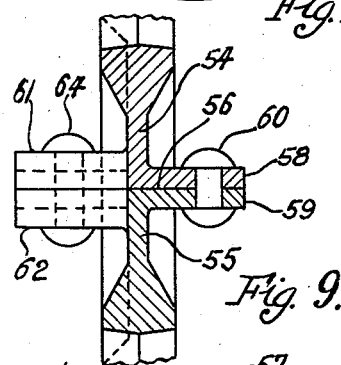
Figure 9 is a vertical cross sectional view taken on the segmental line 9—9 looking in the direction of the arrows further illustrating the manner in which the conveyor flight sections are clamped together to one of the links of a conveyor chain.
Figures 6, 8:
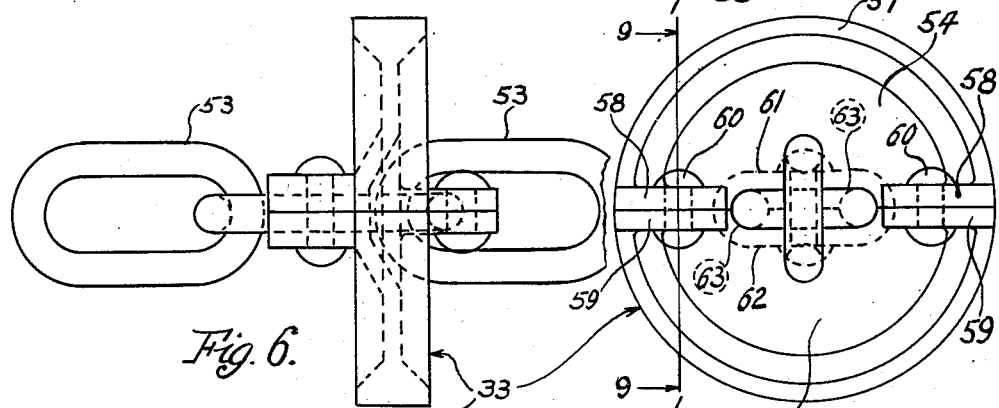
Figure 6 is a side elevational view of a preferred form of the invention illustrating one of the detachable conveyor flights clamped about a conveyor chain.
Figure 8 is an end elevational view of the conveyor flight showing the manner in which the same is centrally positioned on the conveyor chain and illustrating the manner in which the same is clamped securely in place.
Figure 7:
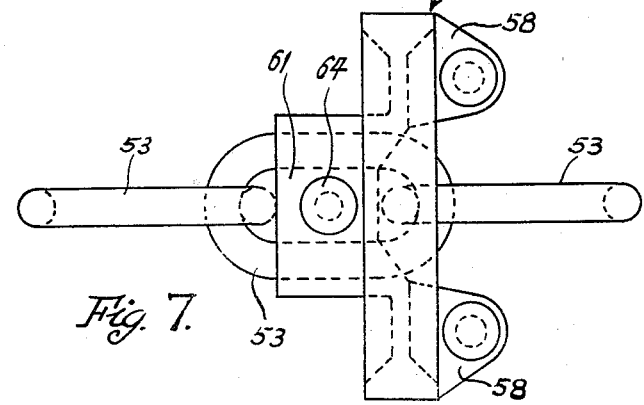
Figure 7 is a top plan view of the conveyor flight shown in Figure 6 illustrating the position and location of the various attaching lugs to facilitate the attachment of a conveyor flight to the conveyor chain.

In the modified form of the invention shown in Figures 10 to 12 inclusive, the conveyor flights 33 are formed as integral units of substantially disc-like shape with a reduced central portion 65 terminating in an enlarged peripheral portion 66 to form scraping edges 67. In this form of the invention, the endless chain shown and described in Figures 1 to 9 inclusive is eliminated and the conveyor flights 33 are provided on opposite sides of the web-like disc portion 65 with oppositely disposed link arms 68 and 69 extending in planes at right angles to one another. The link arms are formed integral with the web-like portion of the flights as at 65 and are provided in their outer ends with pintle pin receiving apertures 70 and 71 so that when the link arms 68 and 69 are overlapped as shown in Figure 10, the pintle pin 72 may extend through the aligned apertures 70 and 71 so as to be held in place by a cotter key or pin 73. A washer 74 may be interposed between one of the link arms 68 and the cotter pin 73 to reduce friction therebetween. It is to be noted that the link arms 69 are spaced a distance apart slightly less than the distance between the link arms 68 so that the link arms 68 will overlap the arms 69, and when the pintle pin 72 is in position relative movement between the conveyor flights 33 will be accommodated in directions at right angles to each other. By arranging the pintle pins 72 in alternate directions the conveyor flights 33 may travel through the conveyor housing as shown in Figures 1 and 2 or ones substantially similar thereto without affecting the binding action between the walls of the conveyor housing and flights and enabling the flights to negotiate the arc about the axis of the pulleys within the conveyor housing.

In the second modified form of the invention shown in Figures 13 to 15 inclusive, the conveyor flights 33 are formed similar to the ones shown in Figures 10 to 12 inclusive and generally comprise a disc-like web portion 75 having an enlarged peripheral portion 76 to form opposed scraping edges 77. Each of the flights 33 in Figures 13 to 15 inclusive is provided with spaced link arms 78 and 79 arranged in parallel relation and formed integral with and projecting from opposite sides of the web-like disc portion 75. The free ends of the link arms 78 and 79 are provided with pintle receiving apertures 80 and 81 respectively which may be aligned as shown in Figure 14 for accommodating a pintle pin 83. The pintle pin is retained in position by a cotter key or the like 84, and a washer 85 is interposed between the cotter pin 84 and link arm 78 to reduce friction and prevent displacement of the cotter key. It is to be noted that the link arms 78 and 79 are arranged in offset parallel alignment and are primarily intended to be used in conveyor structures where relative turning movement in one direction is necessary.

In the third modified form of the invention shown in Figures 16 to 19 inclusive, the conveyor flights 33 are likewise of disc-shaped form and are provided with web-like central portions 86 having enlarged peripheral portions 87 to provide opposed flanges 88. Formed in the central web-like portion 86 is a pair of spaced openings 89 through which is passed a U-shaped clevis 90 so that the free ends 91 will project through the opposite side of the conveyor flight. Formed at right angles to the openings 89 is a pair of parallel spaced openings or slots 92 for receiving a clevis 93 so that the free ends thereof as at 94 project in a direction opposite to that of the clevis pin 91. The U-shaped clevises 90 and 93 are of substantially the same width, but the arms on the clevis 90 are slightly longer than the arms on the clevis 93. In order to facilitate the connection of the clevis links 90 and 93 with an adjacent conveyor flight, a pair of similar clevises 95 and 96 is provided and these are adapted to extend through slots 97 and 98 likewise at right angles to one another and spaced parallel in the same manner as the slots 89 and 92. The arms of the link clevis 95 are reduced in width as compared with the arms 90 so that the same may overlap, with their apertures 99 and 100 in alignment for receiving a pintle pin 101 held in place by a cotter key 102. The clevis arms 96 are likewise apertured as at 103 and are of a width slightly less than the width between an adjacent pair of clevis arms similar to the ones shown in Figure 16 at 93. The aligned apertures 103 and 104 of the clevis arms 93 and 96 may receive a pintle pin in the same manner as the clevis arms 90 and 95. In each instance, the various pairs of clevis arms 90, 93, and 95, 96 are interlocked with respect to one another with their looped portions gripping opposite sides of the disc-like web portion 86. The conveyor flight disclosed in Figures 16 to 19 inclusive may be used in a conveyor elevator as shown in Figures 1 and 2 as the arrangement of the clevis connecting pins 101 are alternately arranged at right angles, thereby allowing relative swinging movement between the flights in two or more directions while negotiating the turns of the conveyor pulleys.

In Figure 20 the conveyor flight 33 is formed of circumferentially divided sections 105 and 106 fastened together by means of a screw 107 as shown in Figure 20. The divided sections are disc-like in shape and are provided with flanges 108 and 109 respectively adapted to form a circumferential groove for receiving a packing element 110 formed of metal, rubber or other suitable material. By clamping the sections 105 and 106 together by the connecting screw 107 the packing or wearing element 110 will be securely held between the flanges 108 and 109. Aligned openings 112 and 113 are formed in the sections 105 and 106 respectively for receiving link clevis members similar to the link clevises 90, 93, 95 and 96 shown in Figures 16 to 19 inclusive. Other apertures or slots at right angles to the slots or openings 112 and 113 may be formed in the sections 105 and 106 for receiving the interlooped clevis members in substantially the same fashion as set forth in connection with Figures 16 to 19 inclusive.

In Figure 21 the flight sections 105 and 106 are likewise of disc-shape and are fastened together by a machine screw 107 to clampingly engage and retain a wear or packing element formed of metal or leather 115 therebetween so that the peripheral portion will engage the walls of a conveyor casing 117. The peripheral portion of the section 105 is provided with a bevelled enlarged portion 118 while the peripheral portion 119 of the section 106 is provided with a bevelled flange adapted to cooperate with the enlarged bevelled portion 118 to cause the packing element 115 to extend in an oblique direction so that one edge of the packing will scrapingly engage the inner walls of the conveyor conduit and scrape material therefrom adhering thereto. The sections 105 and 106 are apertured as at 120 and 121, similar to the apertures as shown in Figure 20, to facilitate the reception of the interlooped link arms 90, 93, 95, and 96 as shown in Figures 16 to 19 inclusive. Similarly, the flexible packing element 115 may be apertured as at 122 to align with said openings or apertures 120 and 121 to allow the free passage of the clevis connecting and interlooping links. When the flight elements 33, as shown in Figs. 20 and 21, are employed in enlarged conveyor housings 5 as shown in Fig. 27, only a portion of the peripheral wear or packing element engages the inner walls thereof. In Fig. 27, the conveyor flight 33 is of the form shown in Fig. 21 with the wear or packing element 115 sandwiched between the circumferentially divided sections 106 and 105.

In the last modified forms of the invention shown in Figures 22 to 26 inclusive, the conveyor flight 33 is formed of segmental sections 125 and 126 having an enlarged peripheral portion 127 continuous around the circumference of the segmental sections when secured together. The sections 125 and 126 are divided on a diametrical center line 128, and formed integral with each section is an enlarged clamping boss 130 and 131 respectively. The enlarged clamping bosses are provided with opposed recesses 132 and 133 adapted to form a circular opening for receiving a relatively short chain link 134 of a conveyor run-around chain which is continuous in substantially the same manner as set forth in the form of the invention shown in Figures 1 to 9 inclusive. The clamping bosses 130 and 131 project from opposite sides of the web-like body portions 125 and 126 and are disposed centrally thereof so that the axis of the chain will align with the axis of the flight. The segmental sections 125 and 126 are adapted to be fastened together on opposite sides of the chain 134, and as shown clearly in Figure 24 the section 125 is provided with a hook portion 135 adapted to overlie a rib continuation 136 of the enlarged clamping boss 131 at each end thereof. The opposite side of each segmental section 125 and 126 is provided with connecting lugs 137 and 138 adapted to be connected together by means of rivets or the like 139. In Figures 22 to 24 inclusive, the segmental sections 125 and 126 are shown as being circular in shape while in Figure 25 the sections are shown as forming an isosceles trapezoid when the sections are fastened together. In Figure 26, the sections when connected are so shaped as to form a square having at least two walls parallel and opposed so that the conveyor may be used in a structure similar to that shown in Figures 1 and 2 with the flights of the conveyor frictionally engaging and driven by a pair of spaced pulley halves urged toward one another by spring means. The construction of the elements and associated parts in Figures 22 to 26 inclusive are identical in shape and form, with the exception of the peripheral marginal edge which as shown in Figures 25 and 26 may be of irregular shape.

It is to be understood that the forms of the invention herewith shown and described are to be taken as preferred embodiments of the same and that various changes in shape, size and arrangement of parts may be resorted to without departing from the spirit of the invention or the scope of the subjoined claims.

What I claim is:

1. A conveyor structure, comprising a series of conveyor flights, oppositely extending link arms projecting axially from opposite sides of each conveyor flight, said link arms being interlockingly received in apertures in the flights and arranged in pairs at right angles to one another and a pivot pin extending through aligned apertures in the overlapping ends of said link arms arranged at right angles to adjacent pivot pins.

2. A conveyor structure, comprising a series of conveyor flight elements, a plurality of U-shaped connecting links having their arms projecting through openings in said flight members from opposite sides thereof with their U-shaped portions in interlocking engagement, said U-shaped connecting links being arranged in the flight elements at right angles to each other to position the ends of the U-shaped links in overlapping relationship with an adjacent pair of link arms and a pivot pin extending through aligned openings in the U-shaped links to pivotally connect the flights for relative swinging movement in multiple planes.

3. A conveyor structure, comprising a conveyor housing, an endless link conveyor in said housing including a series of U-shaped link members arranged with their ends pivotally connected and their loop portions interlocked, and conveyor flights interposed between the loop portions of said endless conveyor links and assembled in spaced relation one from the other, said flights being removably secured to the endless conveyor and having relatively wide peripheral portions for contactual engagement with said housing, the peripheral portions of the widened marginal portions being formed with obtusely angled surfaces to prevent the radial surfaces of said flights from engaging the conveyor housing.

4. A conveyor structure, comprising a conveyor housing having conveyor courses arranged vertically and horizontally and connected by vertical and horizontal bends, an endless flexible conveyor in said housing traversing said courses and bends including a series of link members connected to swing in planes at right angles one to the other to follow said bends, a series of spaced apart conveyor flights interposed between said link members and interlocked therewith and interposed between the looped portions of said link members, said conveyor being composed of flat U-shaped links with their looped portions interlocked and their ends arranged in overlapping relation and pintle pins extending through the overlapped portions of said links for connecting the same together, the conveyor flights being provided with relatively wide marginal portions at the peripheral edge thereof for contactual engagement with said housing, the peripheral surfaces of the widened marginal portions being formed to prevent the radial edges thereof from scraping the inner wall surface of said conveyor housing in both directions of conveyor travel.

5. A conveyor structure comprising a conveyor housing, an endless flexible conveyor in said housing including a series of U-shaped link members arranged with their ends overlapped and pivotally connected and their looped portions interlocked, and conveyor flights interposed between the interlocked looped portions of said conveyor links and arranged in spaced relation one from the other on said conveyor, said conveyor flights being provided with relatively wide peripheral portions forming housing engaging surfaces at the marginal edges of said flights, the housing engaging surfaces being slightly tapered from the circumferential center of the periphery to the radial edge walls of said flight to prevent the same from scraping the inner walls of said housing.

6. A conveyor structure, comprising a conveyor housing, an endless link conveyor mounted in said housing with the links thereof formed of U-shaped members arranged with their ends pivoted together for swinging movement in different planes, and a series of conveyor flights on said conveyor located in spaced apart relation and interposed between the looped portions of said conveyor, said conveyor flights being provided with relatively wide marginal surfaces for partial contactual engagement with the conveyor housing, the peripheral walls of said relatively wide marginal surfaces being formed to prevent the radial edges thereof from mutilating the conveyor housing.

7. A conveyor structure, comprising a series of conveyor flight elements having apertures therethrough in spaced pairs with one pair of apertures at right angles to the other, U-shaped link members projecting through said apertures from opposite sides thereof and arranged in interlocked relation with the conveyor flight elements therebetween, and link pins extending through the apertured ends of said arms for pivotally connecting the same together, each of said flights being provided with an enlarged peripheral portion having angular surfaces meeting at the center of said periphery to form oppositely extending faces arranged at an obtuse angle relative to one another.

HENRY W. HAPMAN.

REFERENCES CITED

The following references are of record in the file of this patent:

UNITED STATES PATENTS

| Number | Name | Date |
| --- | --- | --- |
| 538,057 | Willson | Apr. 23, 1895 |
| 743,070 | Garland | Nov. 3, 1903 |
| 810,149 | Horst | Jan. 16, 1906 |
| 1,153,375 | Elliott | Sept. 14, 1915 |
| 1,223,594 | Lower | Apr. 24, 1917 |
| 1,262,174 | Clark | Apr. 9, 1918 |
| 1,321,811 | Dellenbach | Nov. 18, 1919 |
| 2,110,204 | Davis | Mar. 8, 1938 |
| 2,124,485 | Dellenbach | July 19, 1938 |
| 2,147,199 | Hapman | Feb. 14, 1939 |
| 2,326,535 | Hapman | Aug. 10, 1943 |